United States Patent
Durazzo et al.

(10) Patent No.: US 12,411,800 B2
(45) Date of Patent: Sep. 9, 2025

(54) CLASSICAL-QUANTUM DATA CONFIDENCE FABRIC

(71) Applicant: Dell Products L.P., Round Rock, TX (US)

(72) Inventors: Kenneth Durazzo, Morgan Hill, CA (US); Stephen J. Todd, North Andover, MA (US); Michael Robillard, Shrewsbury, MA (US); Victor Fong, Melrose, MA (US)

(73) Assignee: Dell Products L.P., Round Rock, TX (US)

( * ) Notice: Subject to any disclaimer, the term of this patent is extended or adjusted under 35 U.S.C. 154(b) by 688 days.

(21) Appl. No.: 17/811,252

(22) Filed: Jul. 7, 2022

(65) Prior Publication Data

US 2024/0012786 A1  Jan. 11, 2024

(51) Int. Cl.
*G06F 15/78* (2006.01)
*G06N 10/40* (2022.01)

(52) U.S. Cl.
CPC ......... *G06F 15/7807* (2013.01); *G06N 10/40* (2022.01)

(58) Field of Classification Search
CPC .................................................. G06F 15/7807
USPC .......................................................... 706/62
See application file for complete search history.

(56) References Cited

U.S. PATENT DOCUMENTS

| | | | |
|---|---|---|---|
| 11,741,211 B2* | 8/2023 | Todd | G06F 21/44 |
| 2022/0043721 A1* | 2/2022 | Shemer | G06F 11/1484 |
| 2022/0100879 A1* | 3/2022 | Todd | G06F 16/2379 |
| 2022/0101336 A1* | 3/2022 | Todd | G06Q 30/018 |
| 2022/0138325 A1* | 5/2022 | Todd | G06F 21/54 726/26 |
| 2022/0207386 A1* | 6/2022 | Todd | G06F 16/27 |
| 2023/0004913 A1* | 1/2023 | Reineke | G06Q 10/06393 |
| 2023/0113941 A1* | 4/2023 | Todd | G06F 16/24568 707/741 |
| 2023/0177372 A1* | 6/2023 | Flöther | G06F 11/3428 716/100 |
| 2023/0267114 A1* | 8/2023 | Reineke | G06F 16/215 707/694 |
| 2023/0421518 A1* | 12/2023 | Pandey | H04L 51/42 |
| 2024/0012786 A1* | 1/2024 | Durazzo | G06N 10/40 |
| 2024/0330139 A1* | 10/2024 | Pande | G06F 11/3051 |
| 2024/0355089 A1* | 10/2024 | Rahmes | G06V 10/76 |
| 2025/0047758 A1* | 2/2025 | Todd | G06Q 30/04 |
| 2025/0071801 A1* | 2/2025 | Rahmes | G06N 20/00 |
| 2025/0080569 A1* | 3/2025 | Thompson | H04L 63/1433 |

* cited by examiner

*Primary Examiner* — Reza Nabi
(74) *Attorney, Agent, or Firm* — Workman Nydegger (57) ABSTRACT

One example method includes receiving, by a hybrid classical-quantum computing system, data from a node of a data confidence fabric, processing the data to create processed data, generating one or more confidence scores relating to the processed data, and making the one or more confidence scores and the processed data available to an end user. The hybrid classical-quantum computing system may also be a node of the data confidence fabric and may perform classical and/or quantum computing operations on the data.

14 Claims, 3 Drawing Sheets

CLASSICAL-QUANTUM DATA CONFIDENCE FABRIC

FIELD OF THE INVENTION

Embodiments of the present invention generally relate to data confidence fabrics. More particularly, at least some embodiments of the invention relate to systems, hardware, software, computer-readable media, and methods for extending data confidence fabric features and functionalities to embrace classical and quantum computation chains.

BACKGROUND

Although quantum computing has proven useful in various applications, and holds the potential for significant advances in computing, a number of problems exist with respect to quantum computing systems and components, and data generated by quantum computing systems.

For example, there is presently no known way to track and determine the confidence score of the input, and output, of a QPU (quantum processing unit). Similarly, there are no mechanisms to capture and track confidence information regarding data resulting from quantum computations, such as experimental results, machine learning models, and decisions, for example.

As another example, if the next hop in a data pipeline is a quantum computer, there is no way for a downstream classical node in a DCF to know if potential candidate quantum systems support DCF capabilities. For example, a classical compute node in a DCF that receives data from a quantum node may have no awareness as to whether or not the data generated by the quantum node is trustworthy or not, and may not be aware of whether or not quantum computing processes performed by the quantum node are trustworthy.

Another complication is that quantum algorithms, which may run at a quantum node or other quantum computation site, are not all deterministic. There are interesting algorithms, for example, that aim for probabilities on the order of 0.66. This means that the algorithm must be run multiple times to ensure that the correct answer is achieved. This is fundamentally different from the sorts of computations that may be performed by classical computing elements in classical DCFs.

As a final example, when an end-to-end classical/quantum algorithm is split into a computational graph and performed in a hybrid classical/quantum computational environment, it becomes difficult to track the overall confidence of the data generated by the classical and quantum elements of that environment.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data confidence fabrics. More particularly, at least some embodiments of the invention relate to systems, hardware, software, computer-readable media, and methods for extending data confidence fabric features and functionalities to embrace classical and quantum computation chains, which may be referred to herein as 'hybrid classical/quantum' computation chains, or simply 'HCQ' computation chains.

In general, example embodiments of the invention may be performed in connection with a DCF (data confidence fabric) that includes a group of nodes, one or more of which may perform quantum operations, such as computing operations for example. Thus, the DCF may comprise, possibly as one of its nodes, a hybrid classical/quantum computing system (HCQS) that may comprise both classical and quantum computing elements.

Data inputs, such as may be received from a DCF node, to a quantum component of an HCQS may be assigned a confidence score by the HCQS, based in part on the source which generated that data. Note that as used herein, a 'confidence score' embraces, but is not limited to a 'data confidence score.' A confidence score may reflect confidence in, and/or trustworthiness of, both data, and the components that generated, and/or interfaced in some way with, the data.

A classical component of the HCQS may incorporate DCF functionality, such as the ability to assess data and assign confidence scores, and the classical component may operate to advertise to classical nodes of the DCF that data confidence functionality is supported by the node that includes the HCQS.

An output of the classical component, which output may comprise a quantum circuit and quantum input parameters, may be assigned a confidence score as well. When the result of a quantum operation, such as by a QPU or vQPU (virtual QPU), is returned to the classical component, the classical component may generate and assign a confidence score to the result of the quantum operation. Thus, in the example case of an HCQS that comprises a node of a DCF, classical and quantum outputs of the HCQS may be assigned respective confidence scores. Finally, an HCQ algorithm that includes the classical component and the quantum component may generate an overall confidence score for the results of the quantum, and classical, operations.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, some embodiments of the invention may apply DCF principles to quantum processes, and data generated by the quantum processes. An embodiment may integrate both quantum, and classical, components and processes in a single DCF. An embodiment may provide a mechanism for a classical node to determine, or be made aware of, the trustworthiness, or not, of a DCF node that may implement quantum processes and may interact with the classical node. Various other advantages of example embodiment will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, quantum and/or classical computing operations within, and/or without, environments such as DCFs (data confidence fabrics). The scope of the invention is not limited to implementation of example embodiments in any particular environment. Thus, operating environments disclosed herein are presented only by way of example.

Figure 1:
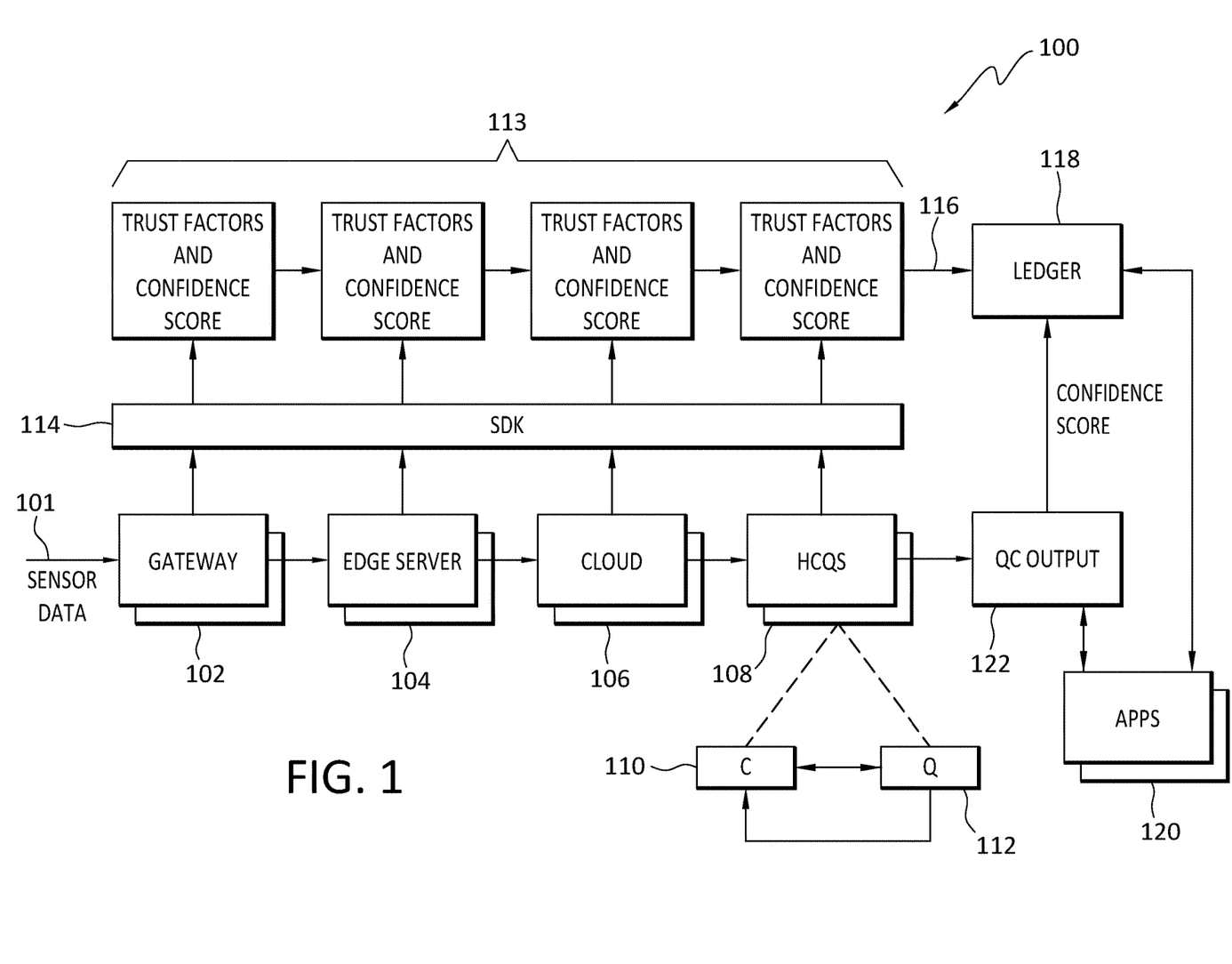
FIG. 1 discloses aspects of an example architecture and operating environment according to some embodiments FIG. 2 discloses aspects of an example method according to some embodiments.

With particular attention now to FIG. 1, one example of an operating environment for embodiments of the invention is denoted generally at 100. In general, the operating environment comprises a DCF 100 that may comprise both classical, and quantum, computing elements, which may individually, or in groups, define respective nodes of the DCF 100. Such classical and/or quantum computing elements may comprise, or be implemented in, systems, components and devices, which may each comprise hardware and/or software, and may each include, but are not limited to, IoT (Internet of Things) devices, including sensors for example. More generally, one or more nodes of the DCF 100 may comprise devices that generate, store, analyze, handle, and/or operate on, data.

In the particular example of FIG. 1, the DCF may include a gateway 102, edge server 104, cloud site 106, and an HCQS 108 (hybrid classical-quantum computing system), which each define or implement a respective node of the DCF 100. As shown, the HCQS 108, which may be implemented as hardware and/or software, may comprise one or more classical computing components 110, such as processors and memory for example, and one or more quantum computing components 112, such as a QPU and/or vQPU for example. The components of the HCQS 108 may be used to run various hybrid quantum-classical (HCQ) algorithms that may include both executable classical computing elements, and executable quantum computing elements. The classical computing component 110 and quantum computing component 112 may communicate with each other for the purposes of sending/receiving data, information, quantum circuits, and quantum inputs, for example. Note that an HCQ algorithm running in an HCQS 108 may comprise, and/or be referred to as, an end-to-end algorithm, as execution of the HCQ algorithm may involve multiple iterations, due to the non-deterministic nature of some quantum computing processes.

In terms of its operations, the DCF 100 may receive data 101, such as from a sensor for example, and the data 101 may transit one or more nodes of the DCF 100. Depending upon considerations such as, but not limited to, the trustworthiness of the hardware and/or software of a node, the DCF 100 may generate and assign a respective confidence score and possibly other trust factors, collectively denoted at 113, to the data 101 associated with each of the nodes that handles, in some way, the data 101. The confidence scores 113 may be collected from the nodes by way of an SDK 114 (software development kit).

With particular reference to the HCQS 108, and as discussed in more detail below, a single confidence score 113 generated for that node may comprise both a quantum element, and a classical element, that is, for example, a confidence score for quantum operations/hardware/data associated with the HCQS 108, and another confidence score for classical operations/hardware/data associated with the HCQS 108. As shown in FIG. 1, the single confidence score 113 for the HCQS 108 may be collected by the SDK 114 and used to create an overall confidence score 116 for the data 101. The overall confidence score 116 may be stored in a ledger 118 that may be accessible by one or more applications 120. As well, the output 122 of the HCQS 108 may be available for use by the applications 120. Because the applications 120 may have access not only to the output 122, but also the overall confidence score 116, and possibly the individual confidence scores 113, the application 120 may be able to assess whether or not to use the output 122, and what the potential risks associated with such use may be.

B. Operations Aspects of Some Example Embodiments

With continued reference to the example of FIG. 1, further details are now provided concerning various operational aspects of some example embodiments of the invention. These aspects are provided by way of example and are not intended to limit the scope of the invention.

In general, each data generation environment, such as one or more of the nodes in FIG. 1, may comprise a hop, or step, in a computation chain with DCF functionalities implemented. Each dataset input, such as the data 101 for example, into a classical/quantum algorithm, such as the HCQS 108 for example, may have a confidence score calculated based on the generation environment, that is, the environment that generated and/or handled the data 101. The classical execution environment, which may comprise classical computing components 110, of the HCQS 108 may also have DCF integrated, and may have the ability to advertise, to classical nodes, which may be upstream or downstream of the HCQS 108, that DCF is supported.

The output of a classical computing component 110, which output may comprise quantum circuit and/or quantum input parameters, may have a confidence score calculated, and documented with the DCF 100, such as by storage in the ledger 118. A result from a quantum computing component 112, such as a QPU or vQPU for example, may be measured and returned to the classical computing component 110, the classical computing component 110 may also calculate and document confidence score of the quantum result, based on various characteristics, which may be user-defined, and which may include, for example, QPU (quantum processing unit) vendor ID (identification), vQPU (virtual QPU) underlying components, QPU model, error rate, accuracy score, network configuration, shots, and fabric setting. Note that when a remote QPU, such as a QPU that is not part of the DCF 100, is used, a digital signature may be used by the quantum vendor for the user to verify that the correct QPU vendor has been used. This verification may be used as one of the factors to compute the confidence score for the quantum computing components 112 and, thus, the overall confidence score 113.

An HCQ algorithm run by the HCQS 108 may also calculate and document a confidence score, based on the classical computation, and also based on the QPU results from each circuit execution, as well as the number of execution runs or iterations, also referred to as 'shots,' that were needed to create the result. Multiple QPUs and vendors may provide bases for generation of a confidence score.

For example, when an HCQ algorithm is split into a computational graph and executed on multiple classical and quantum computational components, such as 110 and 112 for example, the HCQ algorithm may take each confidence score into consideration when calculating the final confidence score. In this regard, note that quantum circuit execution may be distributed to different QPU vendors, any or all of which may be employed by the HCQ algorithm. It is noted further that some HCQ algorithms may require parallel execution of multiple different quantum circuits within the same iteration of the HCQ algorithm. These considerations, as well, may be part of a basis for calculating a final confidence score.

In the case where multiple QPU vendors have been used for iterations of computation of an HCQ algorithm, the confidence score may comprise an aggregation of a respective confidence score generated for each iteration, that is, each vendor. It may be useful to generate confidence scores on this individual vendor basis since QPU vendors and models may differ from one another in various factors including, but not limited to, clock speed, error rate, qubit volume, and entanglement characteristics.

Finally, the confidence score generated for an end-to-end classical/quantum algorithm, such as an HCQ algorithm for example, may be used for downstream processing, including decision making, machine learning models, experiment results, and datasets. Also, and as noted elsewhere herein, end users such as application 120 may employ confidence scores to make determinations regarding the data passing through a DCF, such as the DCF 100.

C. Further Discussion

As will be apparent from this disclosure, example embodiments may possess various useful features and advantages. For example, embodiments may implement classical/quantum computation in end-to-end data confidence fabrics (DCF), such as by tracing data generation of each hop, to downstream results generated from quantum computation results. Embodiments may generate confidence scores for both classical and quantum components of an HCQS, as well as overall confidence scores for end-to-end classical/quantum algorithms. Embodiments may enable an HCQS to advertise its ability to support DCF and therefore "join" or "extend" a classical DCF solution. An embodiment may provide for aggregation of confidence score across multiple QPU and vQPU vendors. An embodiment may employ a quantum computation signature and/or quantum accuracy score as criteria used to generate a confidence score. Finally, an embodiment may employ, as an input to generation of a confidence score, a digital signature of quantum vendors used in DCF to ensure correct vendor.

As least in view of the examples above, embodiments may be advantageous over conventional approaches that, in contrast with example embodiments, do not integrate DCF functionalities into classical/quantum systems. As well, embodiments may provide confidence tracing and immutability that far exceed the relatively primitive conventional logging capabilities of HCQSs.

D. Example Methods

Figure 2:
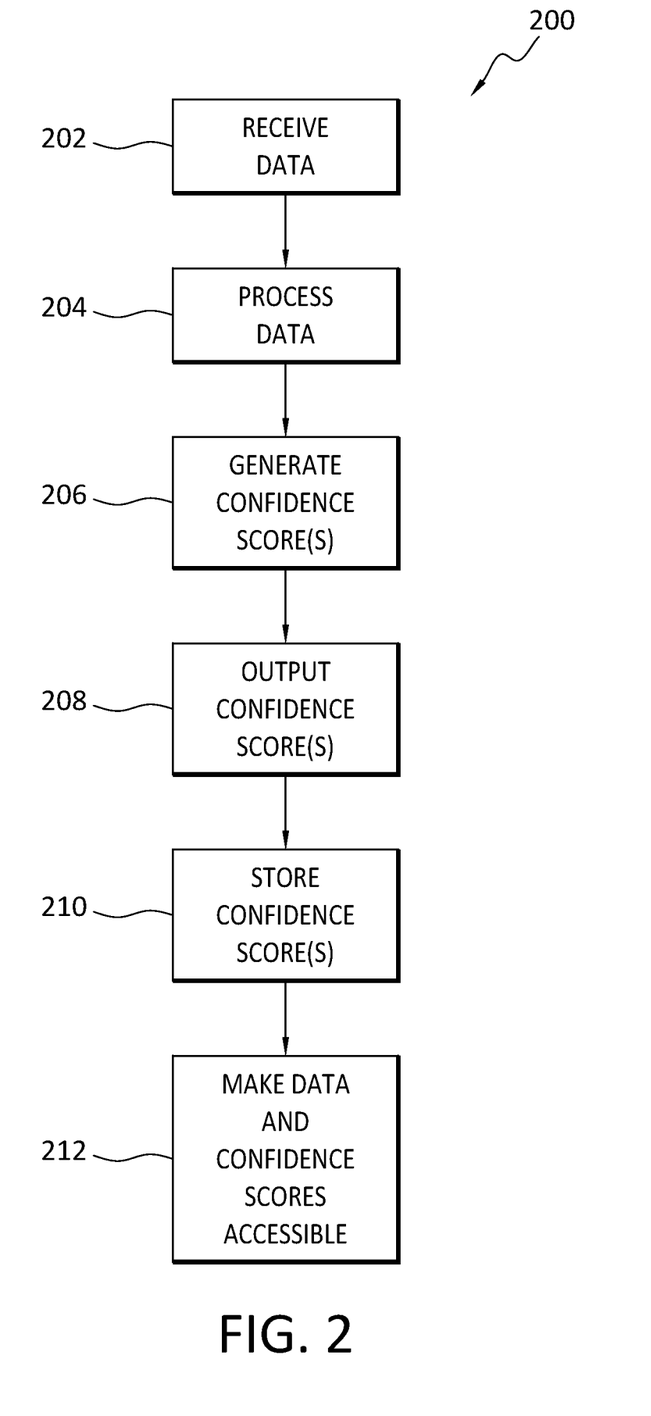

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to some embodiments is denoted generally at 200. In some embodiments, the method 200 may be performed in whole, or in part, by an HCQS that may be a node of a DCF. Data received by the HCQS may be from one or more classical nodes of the DCF. No particular functional allocation, or entities, are required however and, as such, the method 200 is provided only by way of example and is not intended to limit the scope of the invention.

The example method 200 may begin when an HCQS receives data 202, such as from a classical node of a DCF for example. The data may have been generated by that node, or by one or more other nodes upstream of that node. In connection with the receipt 202 of the data, the HCQS may also receive confidence information associated with that data, and generated based on one or more of the nodes that interfaced with the data prior to its receipt 202 at the HCQS. In some cases, the HCQS may be at the uppermost level of a DCF, although that is not required, and in other embodiments, there may be one or more nodes downstream of the HCQS. These downstream nodes may be classical and/or quantum, that is, the downstream nodes may implement classical computing, and/or quantum computing, with respect to data transiting the DCF.

After the data has been received 202, the HCQS may process 204 part or all of the data. The processing 204 may be performed by classical, and/or quantum, computing components. After the processing 204 of the data, the HCQS may generate 206 one or more confidence scores concerning the processed data. In some embodiments, the confidence scores generated 206 may comprise a confidence score concerning operations performed by a classical computing component, as well as a confidence score concerning operations performed by a quantum computing component. The confidence scores may be aggregated to create an overall confidence score that may then be output 208 by the HCQS. Additionally, or alternatively, the HCQS may output the separate respective confidence scores concerning the classical, and quantum, computing operations.

Before, or after, the confidence score(s) have been output 208, the confidence scores may be stored 210, such as in a ledger of a DCF for example. The confidence scores, and data with which the confidence scores are associated, may be made accessible 212 by the DCF to end users of data generated, and/or modified by, any of the nodes, including an HCQS for example, of the DCF. Such end users may comprise, for example, an application, or an ML (machine learning) algorithm.

E. Further Example Embodiments

Following are some further example embodiments of the invention. These are presented only by way of example and are not intended to limit the scope of the invention in any way.

Embodiment 1. A method, comprising: receiving, by a hybrid classical-quantum computing system, data from a node of a data confidence fabric; processing the data to create processed data; generating one or more confidence scores relating to the processed data; and making the one or more confidence scores and the processed data available to an end user.

Embodiment 2. The method as recited in embodiment 1, wherein the processing and the generating are performed by the hybrid classical-quantum computing system.

Embodiment 3. The method as recited in any of embodiments 1-2, wherein the hybrid classical-quantum computing system is another node of the data confidence fabric.

Embodiment 4. The method as recited in any of embodiments 1-3, wherein the one or more data confidence scores comprise a data confidence score relating to a portion of the processed data that was generated by a quantum computing process.

Embodiment 5. The method as recited in any of embodiments 1-4, wherein the one or more data confidence scores comprise a data confidence score relating to a portion of the processed data that was generated by a classical computing process.

Embodiment 6. The method as recited in any of embodiments 1-5, wherein the one or more data confidence scores comprise an aggregated data confidence score applicable to the processed data as a whole.

Embodiment 7. The method as recited in any of embodiments 1-6, wherein a classical component of the hybrid classical-quantum computing system generates output comprising one or both of a quantum circuit, and one or more quantum input parameters.

Embodiment 8. The method as recited in any of embodiments 1-7, wherein the hybrid classical-quantum computing system is operable to notify other nodes of the data confidence fabric that the hybrid classical-quantum computing system supports data confidence operations.

Embodiment 9. The method as recited in any of embodiments 1-8, wherein the one or more data confidence scores comprise a data confidence score aggregated across multiple quantum processing unit vendors.

Embodiment 10. The method as recited in any of embodiments 1-9, wherein part of the processed data is generated by one or more quantum processing units.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines, whether classical or quantum, that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system, which may comprise classical and/or quantum components, as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
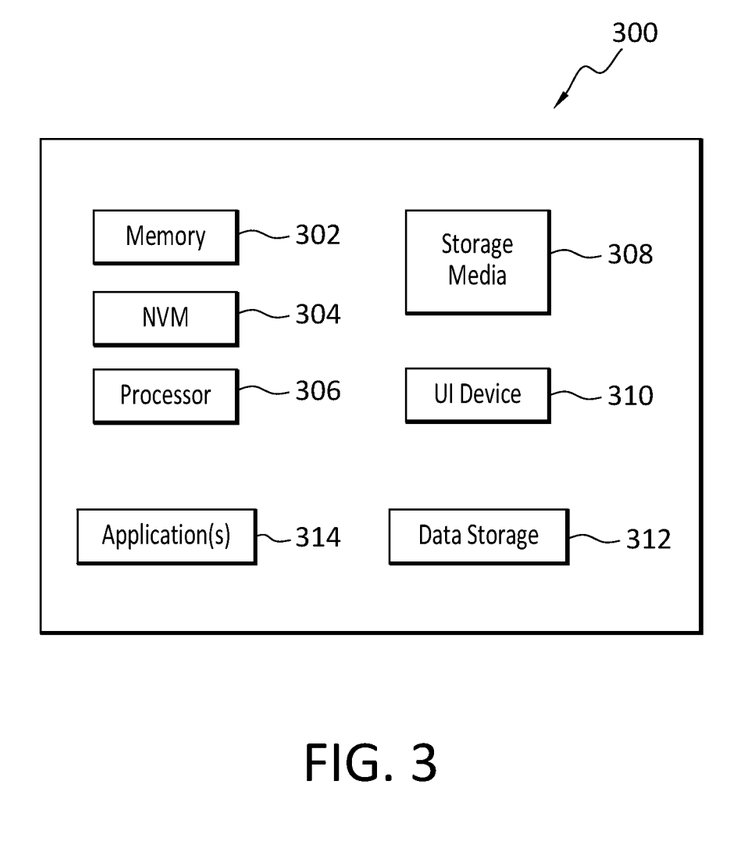
FIG. 3 discloses aspects of an example computing entity which is operable to perform any of the claimed methods, processes, and operations, whether classical and/or quantum.

With reference briefly now to FIG. 3, any one or more of the entities disclosed, or implied, by FIGS. 1-2 and/or elsewhere herein, may take the form of, or include, or be implemented on, or hosted by, a computing device that may comprise classical, and/or quantum, hardware and/or software, one example of which is denoted at 300. As well, where any of the aforementioned elements, such as a QPU for example, may comprise, or consist of, a virtualization, such as a vQPU, of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more processors 306 which may comprise hardware processors and/or QPUs, non-transitory storage media 308, UI (user interface) device 310, and data storage 312. One or more of the memory components 302 of the computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving, by a hybrid classical-quantum computing system, data from a node of a data confidence fabric, and the hybrid classical-quantum computing system is operable to notify one or more other nodes of the data confidence fabric that the hybrid classical-quantum computing system supports data confidence operations;
    processing the data to create processed data;
    generating one or more confidence scores relating to the processed data, and the one or more data confidence scores comprise an aggregated data confidence score applicable to the processed data as a whole;
    making the one or more confidence scores and the processed data available to an end user; and
    a classical component of the hybrid classical-quantum computing system generates output comprising one or both of a quantum circuit, and one or more quantum input parameters.

2. The method as recited in claim 1, wherein the processing and the generating are performed by the hybrid classical-quantum computing system.

3. The method as recited in claim 1, wherein the hybrid classical-quantum computing system is another node of the data confidence fabric.

4. The method as recited in claim 1, wherein one of the one or more data confidence scores is a data confidence score relating to a portion of the processed data that was generated by a quantum computing process.

5. The method as recited in claim 1, wherein one of the one or more data confidence scores is a data confidence score relating to a portion of the processed data that was generated by a classical computing process.

6. The method as recited in claim 1, wherein the aggregated data confidence scores is a data confidence score aggregated across multiple quantum processing unit vendors.

7. The method as recited in claim 1, wherein part of the processed data is generated by one or more quantum processing units.

8. A non-transitory storage medium having stored therein instructions that are executable by one or more hardware processors to perform operations comprising:
    receiving, by a hybrid classical-quantum computing system, data from a node of a data confidence fabric, and the hybrid classical-quantum computing system is operable to notify one or more other nodes of the data confidence fabric that the hybrid classical-quantum computing system supports data confidence operations;
    processing the data to create processed data;
    generating one or more confidence scores relating to the processed data, and the one or more data confidence scores comprise an aggregated data confidence score applicable to the processed data as a whole;

making the one or more confidence scores and the processed data available to an end user; and a classical component of the hybrid classical-quantum computing system generates output comprising one or both of a quantum circuit, and one or more quantum input parameters.

9. The non-transitory storage medium as recited in claim 8, wherein the processing and the generating are performed by the hybrid classical-quantum computing system.

10. The non-transitory storage medium as recited in claim 8, wherein the hybrid classical-quantum computing system is another node of the data confidence fabric.

11. The non-transitory storage medium as recited in claim 8, wherein one of the one or more data confidence scores is a data confidence score relating to a portion of the processed data that was generated by a quantum computing process.

12. The non-transitory storage medium as recited in claim 8, wherein one of the one or more data confidence scores is a data confidence score relating to a portion of the processed data that was generated by a classical computing process.

13. The non-transitory storage medium as recited in claim 8, wherein the aggregated data confidence score is a data confidence score aggregated across multiple quantum processing unit vendors.

14. The non-transitory storage medium as recited in claim 8, wherein part of the processed data is generated by one or more quantum processing units.

* * * * *

UNITED STATES PATENT AND TRADEMARK OFFICE
CERTIFICATE OF CORRECTION

| | | |
|---|---|---|
| PATENT NO. | : 12,411,800 B2 | Page 1 of 1 |
| APPLICATION NO. | : 17/811252 | |
| DATED | : September 9, 2025 | |
| INVENTOR(S) | : Kenneth Durazzo et al. | |

It is certified that error appears in the above-identified patent and that said Letters Patent is hereby corrected as shown below:

In the Specification

Column 1
Line 67, change "according to some embodiments" to -- according to some embodiments. --

Column 7
Line 2, change "process 204" to -- process 204 --

In the Claims

Column 10
Claim 6, Line 48, change "confidence scores" to -- confidence score --

Signed and Sealed this
Twenty-third Day of December, 2025

John A. Squires
*Director of the United States Patent and Trademark Office*